June 13, 1961 R. A. OLSON 2,988,206
REFUSE RECEPTACLE FOR USE IN AUTOMOBILES AND THE LIKE
Filed Oct. 7, 1957

INVENTOR
REUBEN A. OLSON
BY
Gardner & Zimmerman
ATTORNEYS

United States Patent Office 2,988,206
Patented June 13, 1961

2,988,206
REFUSE RECEPTACLE FOR USE IN AUTO-
MOBILES AND THE LIKE
Reuben A. Olson, 725 W. Orangeberg Ave.,
Modesto, Calif.
Filed Oct. 7, 1957, Ser. No. 688,502
2 Claims. (Cl. 206—19.5)

The present invention relates to an improved container adapted for removable mounting in such as automotive vehicles to receive refuse and the like.

With the modern marked increase in the number of automobiles and trucks travelling on the ever expanding network of highways there has arisen the problem of litter deposited in great quantities over the countryside and particularly within cities, for even if waste is thrown or ejected from a small percentage of the vehicles on streets and highways, the result is a tremendous quantity of litter. This condition is highly undesirable not only from the esthetic view point but also from the standpoint of health safety.

Attempts to combat the aforementioned condition through campaigns aimed at educating the motorized populace have proven generally unsuccessful as have the numerous ordinances and laws enacted to punish those throwing papers and the like from vehicles on public thoroughfares. One basic reason for these failures lies in the fact that within automotive vehicles there are no ready receptacles for trash and the like other than conventional ash trays which are only large enough to retain matches, ashes and the like. The present invention provides such a receptacle.

As regards the requirements of a practical receptacle or container for automotive vehicles it is of prime importance that same be convenient to use. A further and important requirement is low cost, in fact total lack of cost to the user is preferable, while ease of installation within the vehicle is likewise a factor. Relative to convenience, the present invention in its preferred embodiment is disposable i.e., intended for limited use and replacement, so that the user is not faced with any problem of cleaning or maintaining same. Also, the receptacle of this invention is adapted for ready detachable mounting within the auto cab in such a manner that there is no danger of same tipping or moving about during the various motions of the vehicle. In line with the above stated requirement of easy installation this invention is extremely simple to mount and to remove with the mounting in no way defacing the automobile and yet providing a relatively rigid mount whereby the receptacle is firmly fixed in position. This mounting is accomplished via the rug or mat in the automobile cab so as not to occupy space normally used and to in no way interfere with the vision of driver or riders. The requirement of low cost is fully satisfied by the present invention for the receptacle thereof preferably comprises only a cut out on suitable semi-rigid and at least partially resilient material with appropriate fold lines thereon whereby the user may rapidly and readily fold same into a completed container. Although receptacles in accordance with the preferred form of the invention may of course be distributed through conventional retail outlets directly to the user, the cost is so nominal that organizations such as industrial companies may readily supply same as giveaways for far less cost than present day driver educational campaigns and yet benefit from advertising readily applied to the flat exterior receptacle surfaces. The folding property of the invention is of course highly advantageous in that the cost of original manufacture, transportation and storage is minimized as each receptacle is planar until folded into container configuration at the time of use.

It is accordingly an object of the present invention to provide an improved receptacle having demountable attachment means adapted to cooperate with vehicle floor covering, and which may be readily placed in operative position in a convenient location within the vehicle, and with equal care, remove the same therefrom.

It is a further object of the present invention to provide apparatus of the character described comprising a planar cut out with fold lines forming in folded position a lidded receptacle and having means for removable attachment within a vehicle cab.

Yet another object of the present invention is to provide a semi-rigid disposable receptacle for vehicles and having in addition to removable attachment means, spaced stabilization means fixing the attached receptacle position.

The invention possesses other objects and features of advantage, some of which, with the foregoing, will be set forth in the following description of the preferred form of the invention which is illustrated in the drawing accompanying and forming part of the specification. It is to be understood, however that variations in the showing made by the said drawing and description may be adopted within the scope of the invention as set forth in the claims.

The preferred form of the invention is illustrated in the accompanying drawing wherein.

Figure 1:
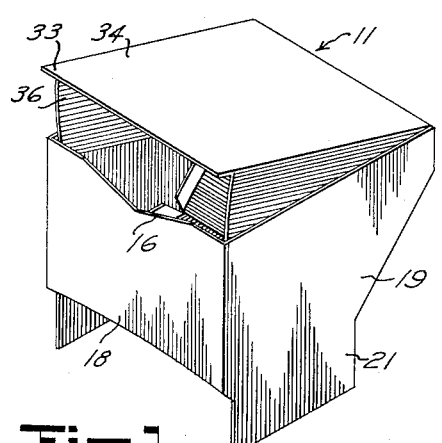
FIGURE 1 is a projected view of the receptacle folded together.
Figure 4:
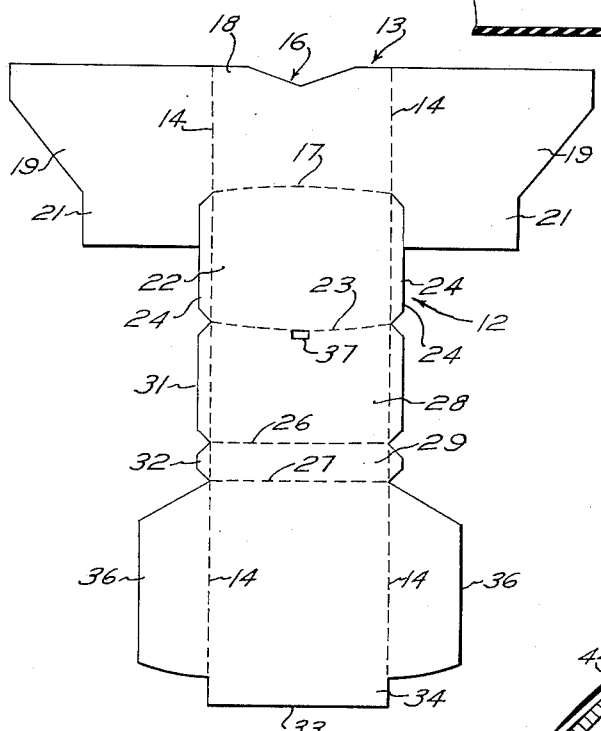
FIGURE 4 is a plan view of the receptacle unfolded and not including the attachment means thereof.

Considering now the structural details of the invention as illustrated, and referring first to FIGURE 4, there is provided as the receptacle proper 11 a flat sheet 12 of semi-rigid material such as heavy paper, light cardboard, or the like, appropriately cut out in such a configuration that folding thereof produces the box-like receptacle shown in FIG. 1. While it is of course possible to vary the sheet outline to produce desired receptacle configurations, as for example special effects like heads or the like, in simple form the sheet includes an elongated rectangular center section 13 defined by indented or perforated fold lines 14 extending substantially the length thereof on opposite sides of the section and various lateral extensions defined below. One end of the center section 13 has a V-notch 16 formed therein and spaced therefrom a fold line 17 curved convexly relative to the notched end to define a front receptacle section 18. On opposite sides of this front section extend mirror-image side sections 19 having offset outer edges and lower appendages or tabs 21 extending past the fold line 17. Immediately adjacent the front section 18 there is defined a bottom section 22 between the transverse fold line 17 and a second transverse fold line 23 curved oppositely to the line 17, with narrow flaps 24 along the sides thereof outside the longitudinal fold lines 14. A pair of spaced transverse back fold lines 26 and 27 define with the fold line 23 two continuous back sections 28 and 29 having the same dimensions as the offset edges of the side portions 19 and also provided with narrow side flaps 31 and 32, respectively, outside longitudinal fold lines 14. The remaining part of the center portion 13 from the fold line 27 to the end edge 33 thereof defines a receptacle top section or lid 34 while relatively large top flaps 36 extend laterally from the longitudinal fold lines 14 defining the lateral edges of the top section 34. Each of the above described flaps extending laterally of the center section 13 from the longitudinal fold lines 14 have tapered adjacent edges so as not to interfere with each other when the sheet 12 is folded into the box shape of FIG. 1.

As shown in FIGURE 1, the sheet 13 is readily folded along the fold lines noted above to form a lidded receptacle 11 of generally box-like configuration from which the side appendages 21 depend in spaced relation and the bottom 22 thereof being curved upwards along the center thereof. Receptacle assembly requires only that the bottom flaps 24 be folded inside the sides and either of the back flaps 31 or 32 folded outside the sides or alternatively that glue, staples or other fastening means or the like connect the sides thereto. The wide top flaps 36 preferably are folded inside of the sides 19 and the front edge 33 of the top 34 extends beyond the flaps to overhang the receptacle front 18 and prevent inadvertent top depression into the receptacle. The front notch 16 provides ready access to the underside of the top for lifting same as desired.

Figure 2:
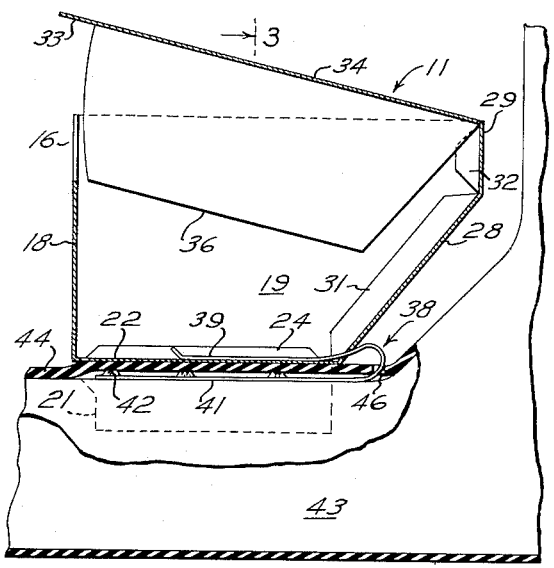
FIGURE 2 is a center sectional view of the receptacle mounted within a vehicle cab and showing a portion of the latter in section.
Figure 3:
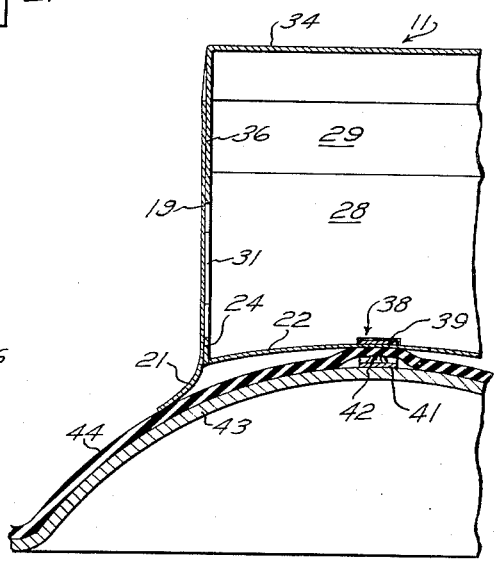
FIGURE 3 is a sectional view taken at 3—3 of FIGURE 2.

There is additionally provided in the sheet 13 a small slot 37 in the first or lower back section 28 along the rear bottom fold line 23 to receive attachment means 38, as illustrated in FIGURES 2 and 3. This attachment or mounting means 38 is formed as a spring clip having somewhat of a U-shape with an upper leg 39 inserted through the receptacle slot 37 on the bottom section 19 and a lower leg 41 outside the receptacle having a gripping upper surface thereof. This gripping surface is formed by ridged bosses 42 or other roughening so as to grip material between the legs 39 and 41.

Mounting of the receptacle is best accomplished upon the floor 43 of an automobile or the like as at the transverse center thereof wherein the floor is generally concave to fit over the conventional automobile transmission and drive shaft. Removable mounting is actually made to a floor covering 44 such as a rug or floor mat by cutting a small slit 46 therein transversely of the cab. The lower outer leg 41 of the mounting means 38 is slid through this floor mat slit 46 and directed rearwardly of the automobile and the upper leg 39 of the mounting means is disposed in removable or permanent position within the receptacle to clamp together the receptacle bottom 19 and floor covering 44 by the resiliency of the mounting means. Generally, an improved clamping action is obtained by foreshortening the upper leg 39 of the mounting means to terminate back of at least some of the gripping means 42 on the lower leg 41 thereof while a turned up end on the upper leg 39 is advantageous where the receptacle is to be removed from the mounting means.

Clearly the mounting means may be permanently affixed to the receptacle for use and disposal therewith; however, the interest of economy is best served by leaving the mounting means on the floor mat and replacing only the receptacle. In mounting the receptacle of the present invention the sheet 13 is first folded to a closed condition, as shown in FIGURE 1, and with a detachable mount 38, the lower mount leg 41 is slid under the floor mat 44 through the slit 46 therein. The receptacle is then slid onto the mount by slipping the upper leg 39 of the latter through the slot 37 in the back 28 of the receptacle. In this position the receptacle bottom 19 is clamped to the floor mat 44 and the lower side tabs 21 are forced to bend outwardly, as shown in FIGURE 3, to thereby fix the receptacle sides in position and prevent tipping of the receptacle. In this position the receptacle is ready for use by occupants of the vehicle with the top movable to open and close same. Receptacle replacement is readily accomplished by sliding same off of the mount 38 and sliding another thereon.

If desired, it will be readily appreciated that the receptacle could be formed of a more permanent material, such as molded plastic or the like. In such event, the general configuration would remain substantially the same as illustrated in FIGURES 1 to 3 of the drawing, with the bottom arcuate to overlie the convex vehicle cab floor, and side tabs 21 extending outwardly to serve as a stabilizing means. However, irrespective of the method of assembly or the material used for the receptacle, it is believed that the ease in use, economy in construction, and utility will render the same an asset to the occupants of a vehicle.

What is claimed is:

1. A disposable receptacle for automotive vehicle compartments comprising a container of flexible paperboard material having a bottom and side walls as well as a front and a rear wall and a hinged lid, said rear wall terminating at said bottom so that no portion of the rear wall extends below said bottom, said side walls having resilient depending tabs which extend below said bottom, said rear wall having an opening therein immediately adjacent said bottom, and a spring clip of generally U-shaped configuration having an upper leg projected through such opening and having a lower leg underlying said bottom, said tabs being spaced apart a distance less than the distance between points on the article upon which the receptacle is straddled so that the tabs are spread resiliently outwardly and held in such position by said spring clip, the lower leg of which is adapted to be inserted under a vehicle floor mat.

2. In combination with an automotive vehicle having a floor provided with a drive train tunnel and having a floor mat covering at least a major portion of the floor and tunnel, a disposable receptacle comprising a container having a bottom and side walls and being provided with a front wall and a back wall and a hinged lid, said back wall terminating at said bottom so that no portion thereof extends below the bottom, said side walls having depending tabs extending below said bottom, said receptacle being disposed in straddling relationship to said tunnel and the distance between said tabs in their normal position being less than the distance between corresponding portions of the tunnel upon which they are seated whereby the tabs are resiliently bent outwardly, said back wall having a slot therein, and a spring clip of generally U-shaped configuration having an upper leg projected through said slot and seated upon the upper surface of said bottom and having a lower leg inserted beneath said floor mat, whereby the spring clip holds the receptacle in place with a downward force in opposition to the upward force imparted thereto by said resilient tabs.

References Cited in the file of this patent

UNITED STATES PATENTS

| | | |
|---|---|---|
| 2,345,646 | Williamson | Apr. 4, 1944 |
| 2,411,015 | Wolff et al. | Nov. 12, 1946 |
| 2,826,334 | Musler | Mar. 11, 1958 |

FOREIGN PATENTS

| | | |
|---|---|---|
| 571,939 | Great Britain | Sept. 14, 1945 |